United States Patent
Amano

(10) Patent No.: US 8,830,273 B2
(45) Date of Patent: Sep. 9, 2014

(54) DISPLAY CONTROL APPARATUS AND DISPLAY CONTROL METHOD, DISPLAY CONTROL PROGRAM, AND RECORDING MEDIUM

(75) Inventor: Ryoko Amano, Tokyo (JP)

(73) Assignee: Sony Corporation, Tokyo (JP)

( * ) Notice: Subject to any disclaimer, the term of this patent is extended or adjusted under 35 U.S.C. 154(b) by 498 days.

(21) Appl. No.: 13/173,297

(22) Filed: Jun. 30, 2011

(65) Prior Publication Data

US 2012/0026201 A1 Feb. 2, 2012

(30) Foreign Application Priority Data

Jul. 9, 2010 (JP) ................................. 2010-156639

(51) Int. Cl.
G09G 5/00 (2006.01)
(52) U.S. Cl.
USPC ......................................................... 345/661
(58) Field of Classification Search
None
See application file for complete search history.

(56) References Cited

U.S. PATENT DOCUMENTS

| 2011/0074827 | A1* | 3/2011 | Griffin et al. | 345/661 |
| 2011/0154390 | A1* | 6/2011 | Smith | 725/32 |
| 2011/0163969 | A1* | 7/2011 | Anzures et al. | 345/173 |

FOREIGN PATENT DOCUMENTS

| JP | 09-073381 A | 3/1997 |
| JP | 2000-163031 A | 6/2000 |
| JP | 2001-290585 A | 10/2001 |
| JP | 2002-176578 | 6/2002 |
| JP | 2008-097609 A | 4/2008 |
| JP | 2009-146419 A | 7/2009 |
| JP | 2011-145881 A | 7/2011 |

OTHER PUBLICATIONS

Pogue "Mac OS X Snow Leopard, the missing manual", ISBN: 9781449377243, 2009.*
Office Action issued Nov. 12, 2013 in Japanese Patent Application No. 2010-156639 (with English language translation).
Taizo Sueyasu, "Drug and Drop are Desired to Be Used Even in Technical Focus X" Nikkei Linux, vol. 2, No. 4, Apr. 8, 2000, pp. 134-139.
Japanese Office Action issued on Jun. 10, 2014 in Patent Application No. 2010-156639 with English translation (8 pages).

* cited by examiner

Primary Examiner — Xiao Wu
Assistant Examiner — Yingchun He
(74) Attorney, Agent, or Firm — Oblon, Spivak, McClelland, Maier & Neustadt, L.L.P.

(57) ABSTRACT

An information processing device including a user interface that displays content and receives an input. The information processing apparatus controls the user interface to reduce a size of the displayed content based on a received input, and controls the user interface to display an operation corresponding to the content based on the size reduction.

21 Claims, 18 Drawing Sheets

DISPLAY CONTROL APPARATUS AND DISPLAY CONTROL METHOD, DISPLAY CONTROL PROGRAM, AND RECORDING MEDIUM

CROSS REFERENCE TO RELATED APPLICATION

This application claims the benefit of priority under 35 U.S.C. §119 from Japanese Patent Application JP 2010-156639 filed in the Japan Patent Office on Jul. 9, 2010, the entire contents of which is hereby incorporated by reference.

BACKGROUND

The present disclosure relates to a display control apparatus and display control method, a display control program, and a recording medium.

Recently, apparatus that display an image on an LCD screen and enable viewing of a plurality of images by switching the display image are becoming popular. When viewing an image with such an apparatus, it is desirable to primarily display the image while limiting display of unwanted elements on the LCD screen as much as possible. On the other hand, if an image being viewed is unwanted, it is desirable to be able to delete that image by a simple operation. Japanese Unexamined Patent Application Publication No. 2002-176578 discloses a camera that reads out images recorded onto a memory card, displays the images on an LCD monitor, and enables deletion of displayed images.

SUMMARY

As disclosed in Japanese Unexamined Patent Application Publication No. 2002-176578, operations like the following are conducted in order to delete image data being viewed. In other words, deletion involves an operation to display a menu and call a delete function from the menu, an operation to instruct execution of the delete function, and an operation instructing execution of the delete function once again to confirm execution of the delete function. Since such operations are conducted, the number of operations conducted to delete image data becomes large as the amount of image data to be deleted increases. Also, although the number of operations can be reduced by gesture operations, such operations involve the user memorizing the details of the gesture operations for each function.

Consequently, it is desirable to provide a display control apparatus and display control method, a display control program, and a recording medium able to primarily display images on a display screen during viewing, and also able to realize a desired function with respect to an image by a simple operation.

According to one embodiment, the present disclosure is directed to an information processing device including a user interface that displays content and receives an input. The information processing apparatus controls the user interface to reduce a size of the displayed content based on a received input, and controls the user interface to display an operation corresponding to the content based on the size reduction.

According to at least one embodiment, images can be primarily displayed when viewing images. Also, an operation can be conducted to realize a desired function with respect to an image being viewed without conducting an intermediate operation to transition from the state of viewing an image to a menu screen, etc.

DETAILED DESCRIPTION OF EMBODIMENTS

Hereinafter, an embodiment and modifications will be described with reference to the drawings. The description will proceed in the following order.
<Embodiment>
<Modifications>
Furthermore, the embodiments, etc. to be described hereinafter are ideal specific examples, and although various technically preferable limitations are imposed, the disclosed technology is not to be limited to these embodiments, etc. unless explicitly limiting statements are given in the description hereinafter.

Embodiment

1. Configuration of Display Control Apparatus

Figure 1:
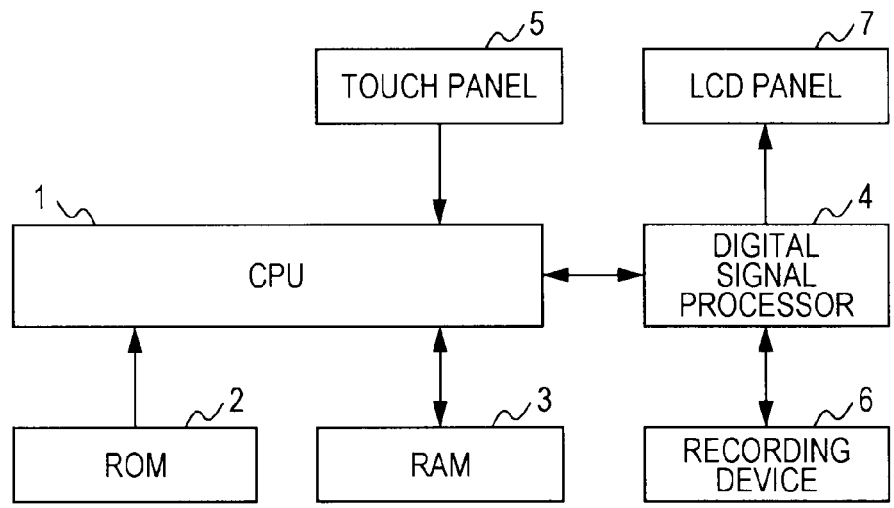
FIG. 1 is a block diagram illustrating a configuration of a display control apparatus in accordance with an embodiment.

FIG. 1 illustrates an exemplary primary configuration of a display control apparatus 10 in accordance with the embodiment. The display control apparatus 10 may be applied to a personal computer, a notebook computer, a portable tablet computer, a digital camera or other imaging apparatus, a portable audio player, or a mobile phone, for example. The exemplary configuration illustrated in FIG. 1 is an exemplary primary configuration of the display control apparatus 10, and obviously various configurations may be added thereto according to the apparatus to which the display control apparatus is applied.

The display control apparatus 10 includes a central processing unit (CPU) 1 that controls the apparatus overall. Coupled to the CPU 1 are read-only memory (ROM) 2 and random access memory (RAM) 3, a digital signal processor 4, and a touch panel 5. The CPU 1 is an example of a display controller and processor, and controls respective components of the display control apparatus 10 by executing programs recorded onto the ROM 2, for example. The RAM 3 is used as work memory when the CPU 1 executes programs, for example.

The digital signal processor 4 executes various signal processing according to control by the CPU 1. Hereinafter, exemplary processes executed by the digital signal processor 4 will be described. The digital signal processor 4 conducts a process to read out image data recorded onto a recording device 6 and decompress the read-out image data, for example. Given signal processing is conducted on decompressed image data, and the image data is converted into an analog signal. The image that has been converted into an analog signal is supplied to an LCD panel 7, and an image corresponding to the image data is displayed on the LCD panel 7.

The digital signal processor 4 conducts a process to delete given image data recorded onto the recording device 6. Furthermore, the digital signal processor 4 reduces an image being displayed on the LCD panel 7 according to control by the CPU 1. A reduction process is conducted by the digital signal processor 4 on the image data of an image being displayed on the LCD panel 7, and reduction-processed image data is supplied to the LCD panel 7. Then, a reduced image is displayed on the LCD panel 7. Besides the above, a process whereby original image data is displayed in place of a reduced image is also conducted by the digital signal processor 4.

The recording device 6 is taken to be a recording medium that can be removably loaded into the display control apparatus 10, and may be Universal Serial Bus (USB) memory, for example. The recording device 6 may also be a hard disk, etc. built into the display control apparatus 10 rather than a freely removable recording medium. Content, exemplified by image data, is recorded onto the recording device 6.

An image corresponding to image data is displayed on the LCD panel 7. Not only images, but also information corresponding to application functions included in the display control apparatus 10, such as information for menu screens and operation assistance, is displayed on the LCD panel 7. The LCD panel 7 may be a panel realized by organic electroluminescence (EL).

The LCD panel 7 is configured as a touch panel, with the LCD panel 7 and the touch panel 5 being physically integrated. In this embodiment, the touch panel implements capacitive sensing, but various other sensing methods such as resistive sensing, optical sensing, or ultrasonic sensing may also be implemented.

Being one example of a pointing device, the touch panel 5 is provided with a circuit according a respective sensing method, and detects the position of an operation performed on the LCD panel 7. For example, if an operation is performed to specify a position where the user touches the LCD panel 7, the touch panel 5 detects the positional coordinates on the LCD panel 7 where the position-specifying operation was performed.

With the touch panel 5, coordinate position input is made possible by position-specifying operations near the LCD panel 7. For example, by incorporating sensors that detect minute capacitance into the touch panel 5, position-specifying operations performed several centimeters away from the LCD panel 7 can be detected. A pyroelectric element that detects slight infrared rays emitted by the human body may also be used to detect position-specifying operations near the LCD panel 7.

The following advantages are obtained by enabling position-specifying operations near the LCD panel 7. Since the LCD panel 7 is not directly contacted, friction is not produced between the LCD panel 7 and the user's finger, and operations can be easily conducted. Also, a feeling of tension in the fingers during operations is reduced, the user can perform operations while confirming images being displayed on the LCD panel 7, and other such advantages are obtained.

Positional coordinates detected with the touch panel 5 are converted into a digital signal, and the digital signal is supplied to the CPU 1. The CPU 1 conducts processing according to the signal expressing positional coordinates supplied from the touch panel 5. The foregoing is the primary configuration of a display control apparatus 10 in accordance with an embodiment.

2. Exemplary Display Images

Figure 2:
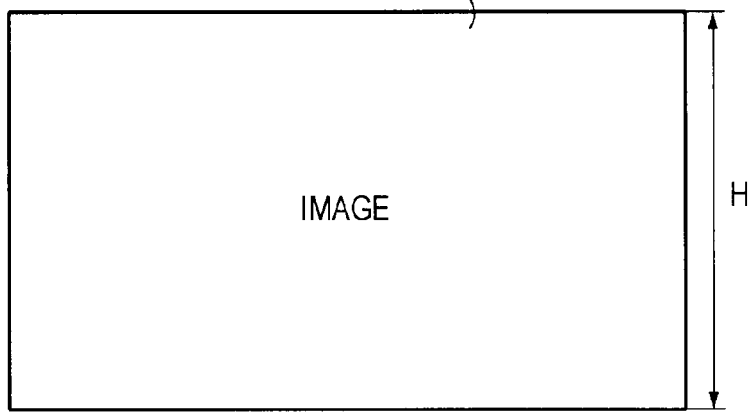
FIG. 2 is an outlined line drawing illustrating an exemplary image displayed on an LCD panel in accordance with an embodiment.

Next, images displayed on the LCD panel 7 will be described. FIG. 2 illustrates one example of an image Im1 displayed on a LCD panel 7 in this embodiment. The image Im1 is taken to be approximately square, for example, with the length in the vertical direction taken to be H. Image data corresponding to the image Im1 is recorded onto the recording device 6.

Figure 3:
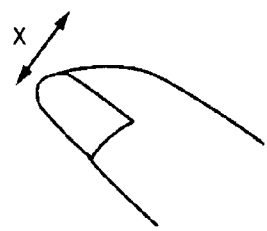
FIG. 3 is an outlined line drawing illustrating an exemplary finger in accordance with an embodiment.

In this embodiment, an operation is performed on an image Im1 displayed on the LCD panel 7 using two fingers. FIG. 3 schematically illustrates a finger used in an operation in this embodiment. The length from the tip to the pad of the finger is taken to be x. Herein, although only one finger is illustrated in FIG. 3, the finger may be one of those in the case where two or more fingers are used in an operation. For example, in the case of conducting an operation using the thumb and forefinger, the length from the tip to the pad of the thumb is taken to be x.

3. Process Overview

Figure 4A:
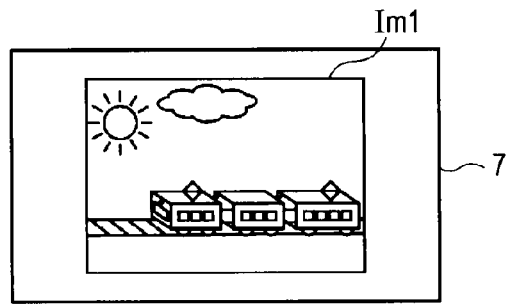
FIGS. 4A to 4E are outlined line drawings illustrating an overview of a process in an embodiment.

Next, an overview of a process in this embodiment will be described with reference to FIGS. 4A to 4E. As illustrated in FIG. 4A, an image Im1 is displayed on the LCD panel 7.

Next, a position-specifying operation that specifies positions in two places on the image Im1 is performed by the user. For example, a thumb F1 and a forefinger F2 may be used to perform a position-specifying operation that approximately contemporaneously specifies two places along the diagonal line joining the lower-left corner and the upper-right corner as viewed in the drawing of the image Im1. The positions of the two places differ depending on the size of the image Im1, but are taken to be near the lower-left corner and near the upper-right corner of the image Im1, for example. Then, an operation to pinch the image Im1 is performed by bringing the thumb F1 and the forefinger F2 closer together along the diagonal line.

Figure 4B:
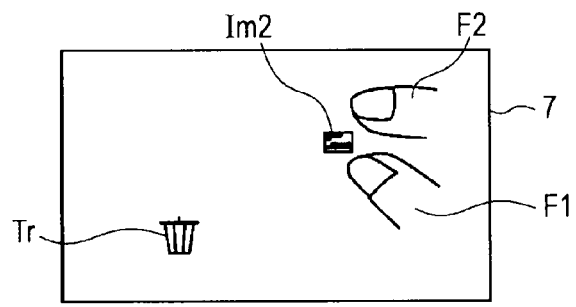

The image Im1 is reduced in accordance with the motion that brings the thumb F1 and the forefinger F2 closer together, as illustrated in FIG. 4B. Then, a reduced image Im2 expressing a reduced version of the image Im1 is displayed on the LCD panel 7. The reduced image Im2 is displayed near the position pinched by the thumb F1 and the forefinger F2. Also, a trash can icon Tr is displayed in the imageless region produced as the image Im1 reduces to the reduced image Im2. This trash can icon Tr is one example of display information expressing an operation with respect to the reduced image Im2.

Figure 4C:
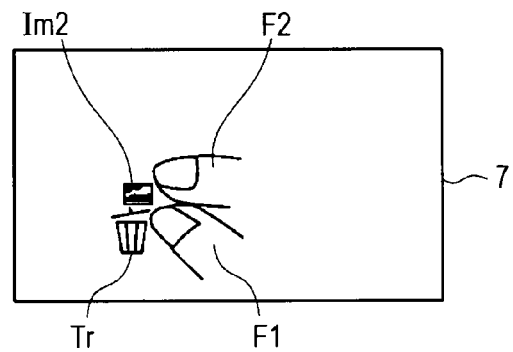
Figure 4D:
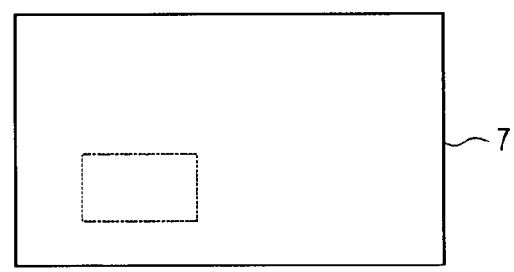

As illustrated in FIGS. 4B and 4C, an operation is performed wherein the thumb F1 and the forefinger F2 are moved while maintaining a state of pinching the reduced image Im2. The display position of the reduced image Im2 changes in accordance with the operation that moves the thumb F1 and the forefinger F2. If the reduced image Im2 is moved to a position where the distance between the reduced image Im2 and the trash can icon Tr becomes equal to or less than a given value, the lid of the trash can icon Tr opens. Then, if the position of the thumb F1 or the forefinger F2 stops being detected on the touch panel 5, the reduced image Im2 and the trash can icon Tr are removed from the LCD panel 7 as illustrated in FIG. 4D. At this time, the digital signal processor 4 deletes image data of the image Im1 corresponding to the reduced image Im2 under control by the CPU 1.

Figure 4E:
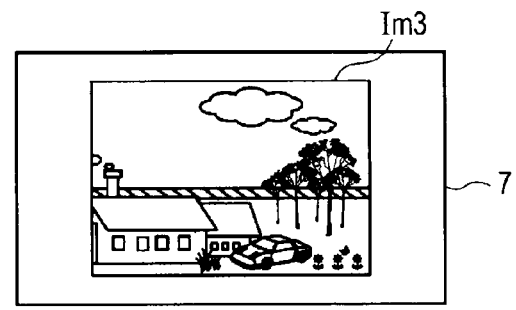

If the reduced image Im2 and the trash can icon Tr are removed from the LCD panel 7, then the next viewing target, an image Im3, is displayed on the LCD panel 7 as illustrated in FIG. 4E. An image data deletion process is conducted on the image Im3 with an operation similar to the operation on the image Im1.

4. Process Details

Figure 5:
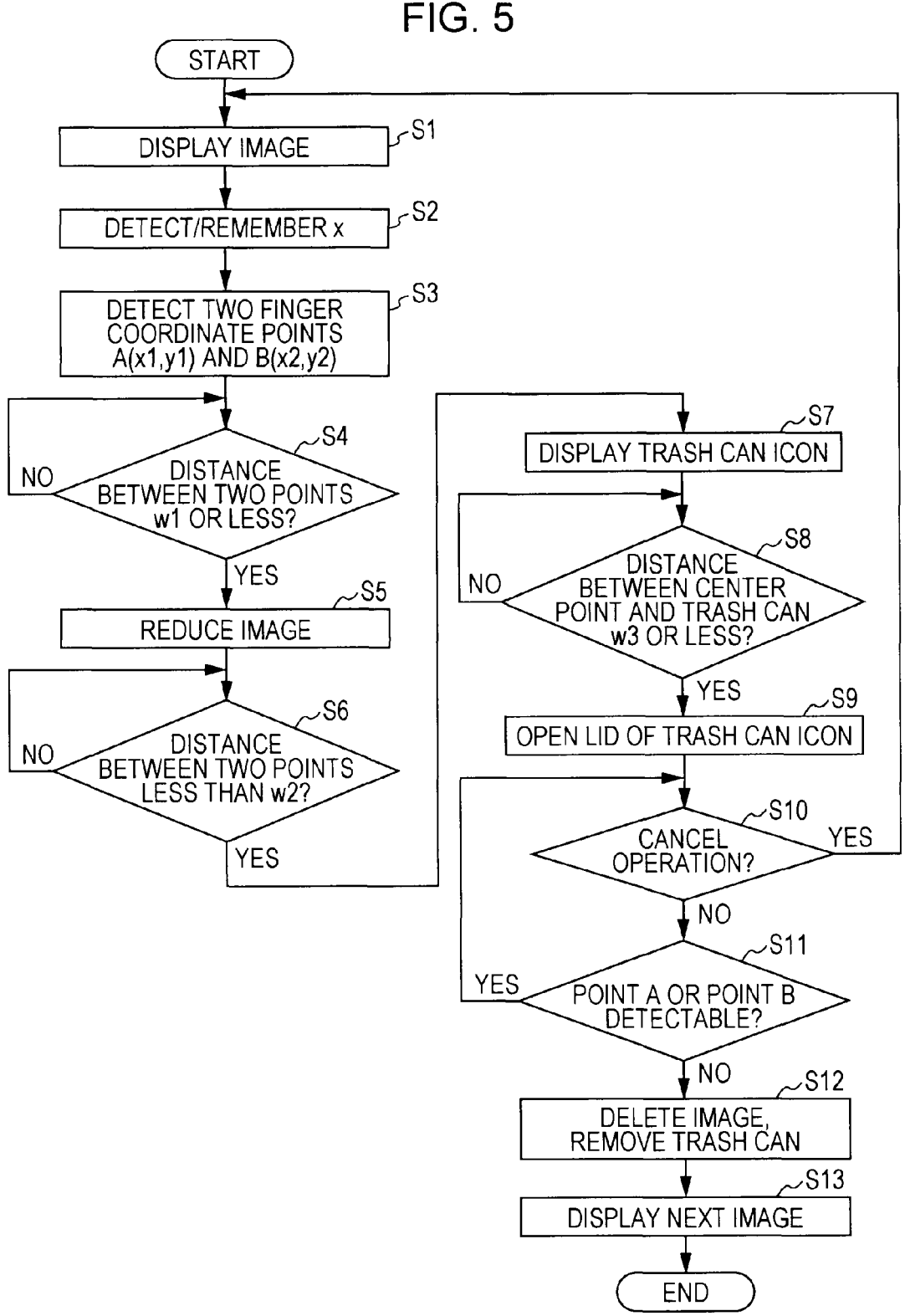
FIG. 5 is a flowchart illustrating a flow of a process in accordance with an embodiment.

Next, details of a process in this embodiment will be described with reference to the flowchart illustrated in FIG. 5. The process illustrated in FIG. 5 is executed under control by the CPU 1. In a step S1, an image Im1 is displayed on the LCD panel 7. The process then proceeds to a step S2.

In step S2, the value of x that was described with reference to FIG. 3 is detected. In this embodiment, the value of x is taken to be the length from the tip to the pad of a thumb F1, for example. The value of x is detected by a sensor (omitted from illustration), for example. A value for x may also be set in advance by the user. A value for x that is an average value for typical users may also be set in advance. The detected value of x is stored in the RAM 3. The process then proceeds to a step S3.

In step S3, the image Im1 displayed on the LCD panel 7 is touched by a thumb F1 and a forefinger F2. A position-specifying operation is performed by the thumb F1 and the forefinger F2 on positions in two places along a diagonal line joining the lower-left corner and the upper-right corner of the image Im1. If the thumb F1 and the forefinger F2 approximately contemporaneously touch the LCD panel 7, the touch panel 5 detects the positional coordinates on the LCD panel 7 that were touched by the respective fingers. Take A(x1, y1) to be the positional coordinates of the LCD panel 7 touched by the thumb F1, and B(x2, y2) to be the positional coordinates of the LCD panel 7 touched by the forefinger F2. The detected positional coordinates of the respective fingers are converted into signals interpretable by the CPU 1, and the converted signals are supplied to the CPU 1.

The distance between the two points A and B change due to the thumb F1 and the forefinger F2 being moved. For example, an operation may be performed wherein the thumb F1 and the forefinger F2 are moved closer together to pinch the image Im1. The distance between the two points shortens according to the pinch operation. The image Im1 is reduced as the distance between the two points becomes shorter. The distance between the two points A and B is calculated by the CPU 1 by using positional coordinates for point A and point B supplied in realtime from the touch panel 5. The process then proceeds to a step S4.

In step S4, it is determined whether or not the distance A-B is equal to or less than a given value w1. The given value w1 is taken to be a preset value, and may be taken to be ⅓ the vertical length H of the image Im1 that was described using FIG. 3, for example. Herein, relative lengths may be compared rather than comparing the distance A-B to the given value w1. For example, it may be determined whether or not the distance A-B has become ⅓ the original distance A-B.

If it is determined that the distance A-B is not less than or equal to the given value w1, the process returns to step S4 and the determination process in step S4 is repeated. If it is determined that the distance A-B is less than or equal to the given value w1, the process proceeds to a step S5.

In step S5, a process to reduce the image Im1 is conducted. In other words, in the case where the distance A-B becomes less than or equal to the given value w1, the CPU 1 determines that an operation to reduce the image Im1 is being conducted, and the CPU 1 conducts control to reduce the image Im1. For example, a reduced image Im2 geometrically similar to the image Im1 may be displayed according to the proportional shortening of the distance between the two points. The digital signal processor 4 conducts this process under control by the CPU 1. The process then proceeds to a step S6.

In step S6, it is determined by the CPU 1 whether or not the distance between the two points is less than a given value w2. The given value w2 is taken to be a value at which further reducing the image Im1 becomes difficult, and may be taken to be the value of x that was described with reference to FIG. 3, for example. If it is determined that the distance between the two points is not less than the given value w2, the determination process in step S6 is repeated. If it is determined that the distance between the two points is less than the given value w2, the process proceeds to a step S7.

In step S7, a trash can icon Tr is displayed on the LCD panel 7. The trash can icon Tr is displayed in the imageless region produced due to the reduction of the image Im1. Consequently, at this stage, a trash can icon Tr and a reduced image Im2 are displayed on the LCD panel 7.

A trash can icon Tr display method will now be described. In this embodiment, a trash can icon Tr may be displayed with consideration for ease-of-use.

Figure 6:
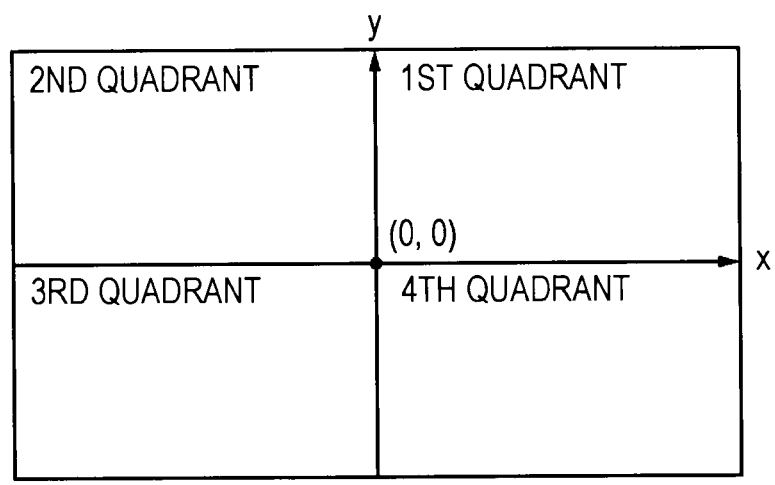
FIG. 6 is an outlined line drawing illustrating exemplary LCD panel divisions in accordance with an embodiment.

As illustrated in FIG. 6, as one example, an LCD panel 7 is divided into four regions by taking the horizontal direction (x-axis direction) and the vertical direction (y-axis direction) as axes. The upper-right region as viewed in FIG. 6 is designated the first quadrant, the upper-left the second quadrant, the lower-left the third quadrant, and the lower-right the fourth quadrant, respectively. Herein, the division lines of the LCD panel 7 illustrated in the drawing may also not be displayed on screen. This similarly applies to arrows representing operations and arrows indicating the reduction state to be described later.

For example, an image Im1 may be touched by a thumb F1 and a forefinger F2 along the diagonal line joining the lower-left corner and the upper-right corner of the image Im1. The image Im1 is reduced in accordance with an operation that brings the thumb F1 and forefinger F2 closer together, and a reduced image Im2 is displayed on the LCD panel 7. At this point, assume that the reduced image Im2 is displayed in the first quadrant, for example. In this embodiment, a trash can icon Tr is displayed in a quadrant different from the quadrant in which the reduced image Im2 is displayed. In other words, the trash can icon Tr is displayed in the third quadrant rather than the first quadrant. The position where the trash can icon Tr is displayed in the third quadrant is suitably set so as to have a fixed distance with respect to the reduced image Im2.

Herein, the position where a trash can icon Tr is displayed is not limited to the method described above. A trash can icon Tr may also be displayed in a direction based on the positions of the two places touched by the thumb F1 and the forefinger F2. Herein, since the image Im1 was touched by the thumb F1 and the forefinger F2 along the diagonal line joining the lower-left corner and the upper-right corner of the image Im1, a trash can icon Tr may be displayed in the third quadrant diagonally opposite the first quadrant where the reduced image Im2 is displayed.

The quadrant where a trash can icon Tr is displayed may also be determined according to the quadrant where a reduced image Im2 is displayed. For example, a trash can icon Tr may be displayed in the fourth quadrant in the case where a reduced image Im2 is displayed in the third quadrant, and a trash can icon Tr may be displayed in the third quadrant in the case where a reduced image Im2 is displayed in the fourth quadrant. A user may also be able to set the quadrant where a trash can icon Tr is displayed in advance. By suitably setting the quadrant where a trash can icon Tr is displayed in this way, an operation to move a reduced image Im2 towards a trash can icon Tr becomes easier, and ease-of-use improves.

Returning again to the flowchart illustrated in FIG. 5, when a trash can icon Tr is displayed in a step S7, the process proceeds to a step S8. In step S8, the thumb F1 and the forefinger F2 are moved while maintaining a pinch operation, and in so doing the reduced image Im2 is moved near the trash can icon Tr. Then, it is determined whether or not the distance between the center c of the reduced image Im2 and the middle of the trash can icon Tr is less than or equal to a given value w3. The given value w3 is a value expressing the vicinity of the trash can icon Tr, and may be taken to be ½ the vertical length of the trash can icon Tr, for example.

If it is determined that the distance between the center c of the reduced image Im2 and the middle of the trash can icon Tr is not less than or equal to the given value w3, the process returns to step S8 and the determination process is repeated. If it is determined that the distance between the center c of the reduced image Im2 and the middle of the trash can icon Tr is less than or equal to the given value w3, the process proceeds to a step S9.

In step S9, a preparatory state for executing a process corresponding to an operation is displayed. The preparatory state is displayed by changing how display information is displayed. For example, the opening of the lid of the trash can icon Tr may be displayed. By opening the lid of the trash can icon Tr, the user is notified that a process for deleting image data will be conducted. At this point, a guide message indicating that image data will be deleted may also be displayed rather than just the lid of the trash can icon Tr opening. The process then proceeds to a step S10.

In step S10, it is determined whether or not a cancel operation has been performed. A cancel operation may for example be an operation wherein a reduced image Im2 that was brought near a trash can icon Tr is moved away from the trash can icon Tr, or in other words, an operation wherein the reduced image Im2 is returned such that the distance between the center c of the reduced image Im2 and the trash can icon Tr becomes a distance greater than the given value w3, while the operation pinching the image Im1 is maintained. In step S10, if a cancel operation is performed, then the process for deleting image data is canceled, and the process returns to step S1. When the process returns to step S1, the image Im1 is displayed on the LCD panel 7 instead of the reduced image Im2.

If it is determined in step S10 that a cancel operation has not been performed, the process proceeds to a step S11. In step S11, it is determined whether or not point A or point B is detectable. If it is determined that a point is detectable, the process returns to step S10 and it is determined whether or not a cancel operation has been performed. If it is determined that point A or point B is no longer detected, the process proceeds to a step S12.

In step S12, the reduced image Im2 and the trash can icon Tr are removed. In other words, the case where point A or point B is no longer detected entails that the operation pinching the reduced image Im2 has been canceled, and that the thumb F1 or the forefinger F2 has been removed from the LCD panel 6. At this point, it is determined that instructions for deleting image data have been issued by the user, and the reduced image Im2 and trash can icon Tr are removed. Then, a process is conducted to delete image data of the image Im1 corresponding to the reduced image Im2 from the recording device 6. The process then proceeds to a step S13. In step S13, the next image data is read out from the recording device 6 and displayed on the LCD panel 7.

MODIFICATIONS

The foregoing thus specifically describes an embodiment, but it is needless to say that various modifications are possible regarding the configuration, processes, etc. of a display control apparatus. Hereinafter, a plurality of modifications will be described.

Modification 1

Figure 7:
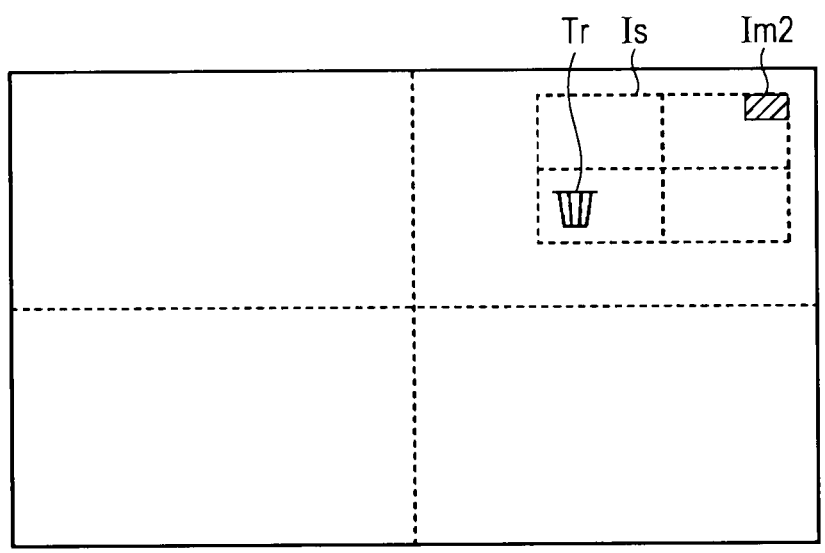
FIG. 7 is an outlined line drawing for explaining a virtual region in accordance with a modification.

First, a modification 1 will be described. The modification 1 is a favorable example for the case of a large LCD panel. FIG. 7 is an exemplary display of an LCD panel 17 in modification 1. The LCD panel 17 is horizontally and vertically divided into four regions, for example. Additionally, a reduced image Im2 is taken to be displayed in the first quadrant of the LCD panel 17. Herein, a process that reduces an image Im1 being displayed on the LCD panel 17 and displays a reduced image Im2 is similar to that of the embodiment described earlier, and thus duplicate description thereof is reduced or omitted.

A trash can icon Tr is displayed in the imageless region produced due to reduction of the image Im1. At this point, if the trash can icon Tr is displayed in a quadrant other than the first quadrant where the reduced image Im2 is displayed, there is a possibility that the distance over which to move the reduced image Im2 to near the trash can icon Tr may become long. Thus, in the modification 1, the trash can icon Tr is displayed in the same quadrant as the quadrant where the reduced image Im2 is displayed.

As illustrated in FIG. 7, first, a virtual region Is that includes the reduced image Im2 is set. The virtual region Is taken to be geometrically similar to the LCD panel 17, and has four quadrants similarly to the LCD panel 17.

At this point, a virtual region Is is such that the quadrant of the LCD panel 17 wherein a reduced image is displayed and the quadrant of the virtual region Is wherein a reduced image Im2 is displayed both have the same relative position. In other words, the reduced image Im2 is displayed in the first quadrant of the LCD panel 17. A virtual region Is is set such that a reduced image Im2 is displayed in the first quadrant of the virtual region Is.

Then, in the virtual region Is, a trash can icon Tr is displayed in a quadrant different from the quadrant wherein the reduced image Im2 is displayed. For example, a trash can icon Tr may be displayed in the third quadrant of the virtual region Is rather than the first quadrant of the virtual region Is. By displaying a trash can icon Tr in this way, a trash can icon Tr can be displayed at a suitable position with consideration for ease-of-use, even in the case of a large LCD panel 17.

Herein, the size of the virtual region Is is suitably set to ensure that the distance between a reduced image Im2 and a trash can icon Tr is equal to or greater than a given length.

Modification 2

Next, a modification 2 will be described with reference to FIGS. 8A and 8B. In the embodiment and modification 1 described earlier, two points are specified using a thumb F1 and a forefinger F2, and an image is reduced according to an operation that brings the thumb F1 and forefinger F2 closer together. In the modification 2, an image is reduced according to a position-specifying operation that specifies one place.

Figure 8A:
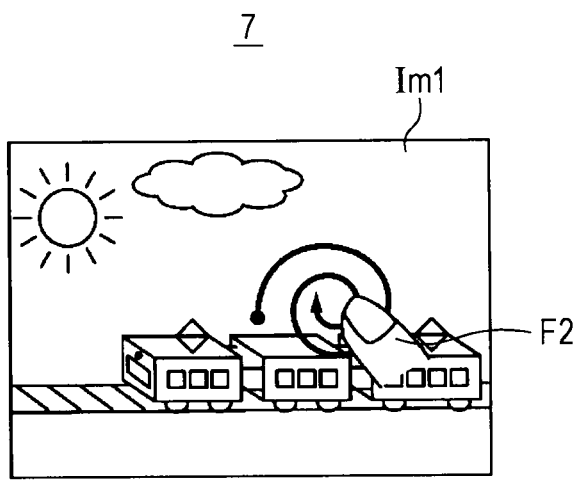
FIGS. 8A and 8B are outlined line drawings for explaining a process in accordance with a modification.
Figure 8B:
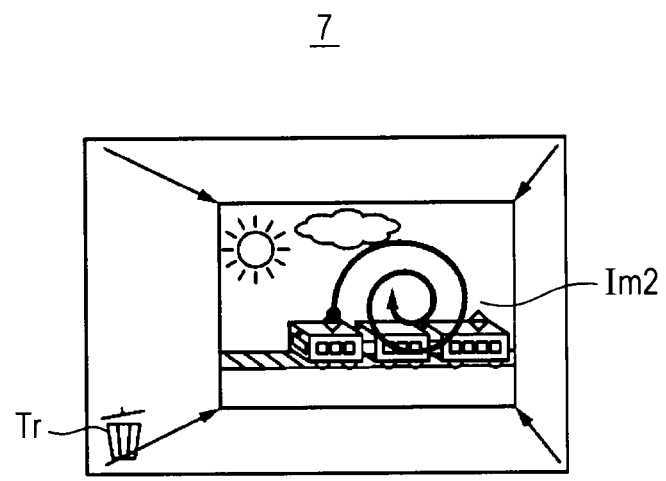

As illustrated in FIG. 8A, an image Im1 is displayed on a LCD panel 7. A position-specifying operation is performed wherein for example a forefinger F2 touches the position of a given place on the image Im1. Then, a revolving operation is performed wherein the forefinger F2 is made to revolve in a clockwise direction. The image Im1 is reduced in accordance with the revolving operation of the forefinger F2, and a reduced image Im2 is displayed. At this point, a trash can icon Tr is displayed in the imageless region produced due to the reduction of the image Im1, as illustrated in FIG. 8B. Also, a cancel operation is performed by causing the forefinger F2 to revolve counter-clockwise, and the reduced image Im2 is enlarged in accordance with the cancel operation. The direction of number of revolutions by the forefinger F2 may be detectable by the CPU 1 on the basis of signals supplied from the touch panel 5. Reduction and enlargement of an image may be controlled by the CPU 1 on the basis of the detection results.

Figure 9:
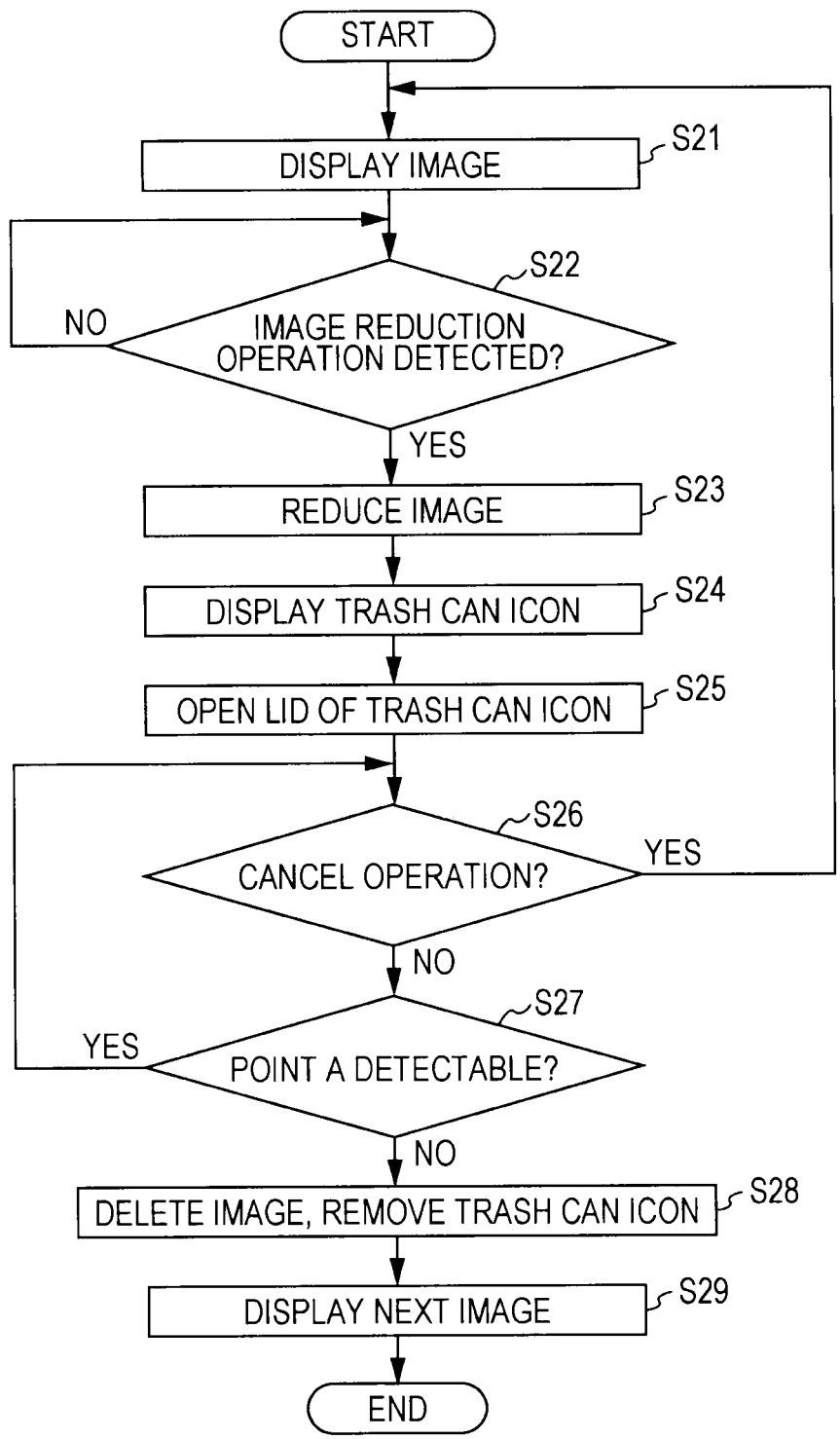
FIG. 9 is a flowchart for explaining a flow of a process in accordance with a modification.

FIG. 9 is a flowchart illustrating a flow of a process in the modification 2. The process illustrated in FIG. 9 is executed by the CPU 1. In a step S21, an image Im1 is displayed on the LCD panel 7. The process then proceeds to a step S22.

In step S22, it is determined whether or not an image reduction operation has been performed. An image reduction operation in the modification 2 is taken to be an operation wherein a place on the image Im1 is touched by a forefinger F2 and wherein the forefinger F2 is made to revolve clockwise. If it is determined that an image reduction operation has not been performed, the process returns to step S22 and the determination in step S22 is repeated. If it is determined that an image reduction operation has been performed, the process proceeds to a step S23.

In step S23, a process is conducted to reduce the image Im1 according to the image reduction operation. The image Im1 is reduced, and a reduced image Im2 is displayed on the LCD panel 7. For example, the image Im1 may be reduced in stages according to the number of revolutions by the forefinger F2. The process then proceeds to a step S24. In step S24, a trash can icon Tr is displayed in the imageless region produced due to the reduction of the image Im1. The process then proceeds to a step S25. In step S25, the opening of the lid of the trash can icon Tr is displayed. The process then proceeds to a step S26.

In step S26, it is determined whether or not a cancel operation has been conducted. A cancel operation in this modification 2 may be an operation where the forefinger F2 is made to revolve counter-clockwise, for example. If it is determined that a cancel operation has been performed, the process returns to step S21. In step S21, an image Im1 is displayed by enlarging the reduced image Im2 according to the cancel operation. If it is determined that a cancel operation has not been performed, the process proceeds to a step S27.

In step S27, it is determined whether or not the place specified by the forefinger F2 (point A) is detectable on the touch panel 5. If it is determined that the specified place is detectable, the process returns to step S26 and the determination process in step S26 is conducted. If it is determined in step S27 that an operation removing the forefinger F2 from the LCD panel 7 has been performed and that point A is no longer detected, the process proceeds to a step S28.

By performing an operation that removes the forefinger F2 from the LCD panel 7 without performing a cancel operation, it is determined that instructions for deleting image data have been issued. Consequently, in step S28, a process is conducted to remove the reduced image Im2 and the trash can icon Tr from the LCD panel 7. Then, image data of the image Im1 corresponding to the reduced image Im2 is deleted from the recording device 6. The process then proceeds to a step S29, and the next image data is read out from the recording device 6 and displayed.

Herein, the timing for displaying a trash can icon Tr and the timing for opening the trash can icon Tr may also be determined according to the proportional reduction of an image Im1. For example, a trash can icon Tr may be displayed when an image Im1 is reduced to a first threshold value (50% the size of image Im1, for example) or less. Then, the image Im1 may be further reduced, and the opening of the lid of the trash can icon Tr may be displayed when the image Im1 is reduced to a second threshold value (30% the size of image Im1, for example) or less.

Modification 3

Figure 10A:
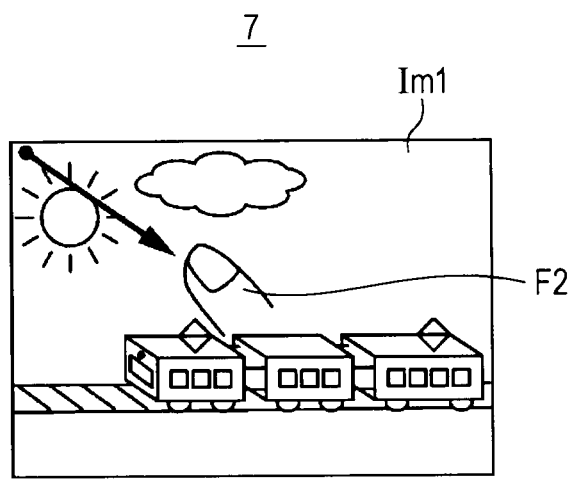
FIGS. 10A and 10B are outlined line drawings for explaining a process in accordance with a modification.
Figure 10B:
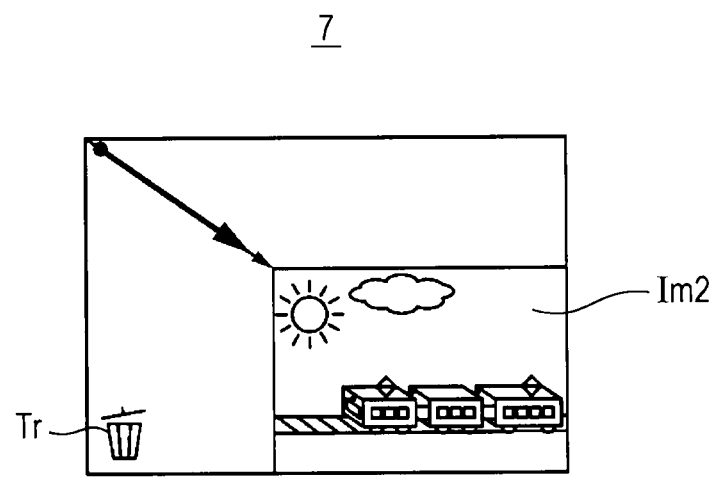

Next, a modification 3 will be described with reference to FIGS. 10A and 10B. The modification 3 is an example wherein a forefinger F2 is used to specify a place on an image Im1, and the image Im1 is reduced in accordance with the motion of the forefinger F2. For example, as illustrated in FIG. 10A, a position-specifying operation may be performed wherein a place near the upper-left corner of the image Im1 as viewed in the drawing of the image Im1 is touched by a forefinger F2. An operation is then performed wherein the forefinger F2 is moved in a diagonal direction (towards the lower-right corner as viewed in the drawing). In so doing, as illustrated in FIG. 10B, the image Im1 is reduced in accordance with the motion of the forefinger F2, and a reduced image Im2 is displayed. Then, a trash can icon Tr is displayed in the imageless region produced due to the reduction of the image Im1. Obviously the diagonal direction may also be taken to be from the upper-right to the lower-left, from the lower-right to the upper-left, or from the lower-left to the upper-right rather than from the upper left to the lower-right.

The flow of a process in the modification 3 is approximately similar to the flowchart illustrated in FIG. 9. Hereinafter, points that differ will be primarily explained. In the modification 3, the image reduction operation in step S22 may be an operation that moves a place specified by a forefinger F2 in a diagonal direction. Also, the cancel operation in step S26 differs. A cancel operation in the modification 3 is an operation that moves a forefinger F2 in the direction opposite the direction moved in order to reduce an image Im1. In other words, as illustrated in FIG. 10A, when a forefinger F2 has been moved from the upper-left to the lower-right as viewed in the drawing in order to reduce an image Im1, the cancel operation may be an operation that moves the forefinger F2 from the lower-right to the upper-left. Other processing is similar to that of the flowchart illustrated in FIG. 9.

Modification 4

Figure 11A:
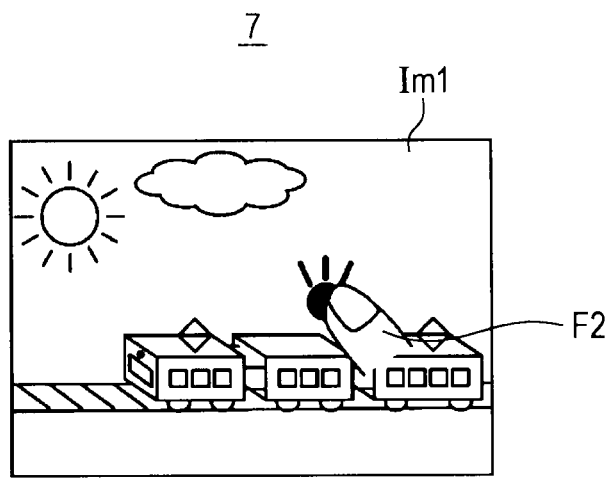
FIGS. 11A and 11B are outlined line drawings for explaining a process in accordance with a modification.
Figure 11B:
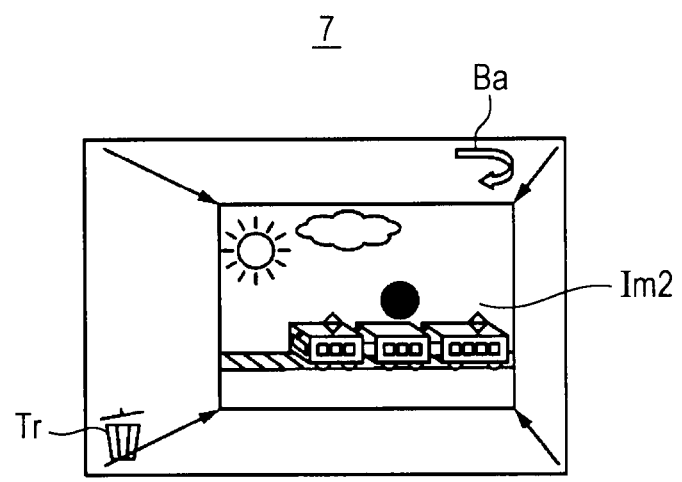

Next, a modification 4 will be described with reference to FIGS. 11A and 11B. As illustrated in FIG. 11A, an image Im1 is displayed on an LCD panel 7. A position-specifying operation is performed wherein a forefinger F2 is used to touch a given place on the image Im1, for example. Then, an operation is performed wherein the LCD panel 7 is consecutively tapped by the forefinger F2 multiple times (three times, for example) during a given amount of time. In so doing, as illustrated in FIG. 11B, the image Im1 is reduced and a reduced image Im2 is displayed. A trash can icon Tr is displayed in the imageless region produced due to the reduction of the image Im1. Also, a back icon Ba is displayed in the imageless region produced due to the reduction of the image Im1.

Herein, an image Im1 may also be reduced in stages according to the number of times a specified place is tapped. The timing for displaying a trash can icon Tr and the timing for opening the lid of the trash can icon Tr may also be determined according to the number of times a specified place is tapped.

The flow of a process in the modification 4 is approximately similar to the flowchart illustrated in FIG. 9. Hereinafter, points that differ will be primarily explained. In the modification 4, the image reduction operation in step S22 may be an operation that taps a place on an image Im1 specified by a forefinger F2. Also, the cancel operation in step S26 differs. A cancel operation in the modification 4 may be an operation that touches the back icon Ba. The processing in step S27 may be processing that determines whether or not a trash can icon Tr has been touched, rather than whether or not a point A can be detected. In other words, in step S27, if it is determined that a trash can icon Tr has been touched, the process proceeds to step S28, and if it is determined that a trash can icon Tr has not been touched, the process returns to step S26. Other processing is similar to that of the flowchart illustrated in FIG. 9.

Modification 5

Figure 12A:
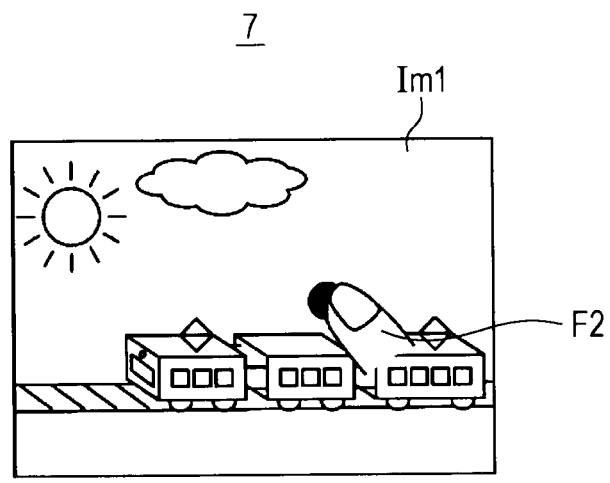
FIGS. 12A and 12B are outlined line drawings for explaining a process in accordance with a modification.
Figure 12B:
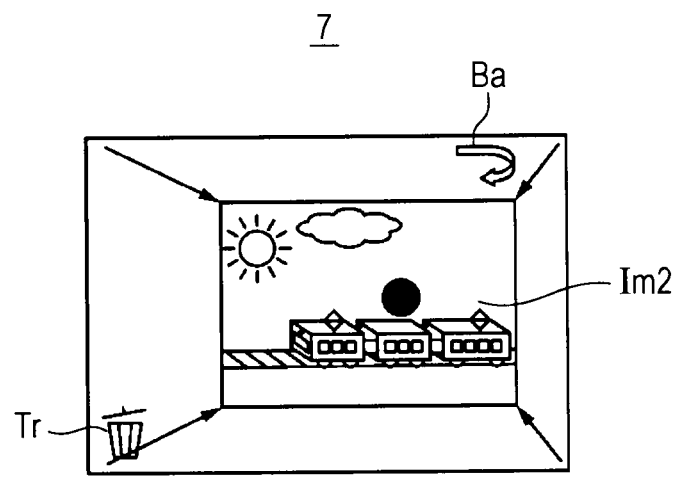

Next, a modification 5 will be described with reference to FIGS. 12A and 12B. As illustrated in FIG. 12A, an image Im1 is displayed on an LCD panel 7. A position-specifying operation is performed wherein a forefinger F2 is used to touch a place on the image Im1, for example. Then, the position-specifying operation is maintained for a given amount of time. If the given amount of time passes, then as illustrated in FIG. 12B, the image Im1 is reduced and a reduced image Im2 is displayed at a given position on the LCD panel 7. A trash can icon Tr is displayed in the imageless region produce due to the reduction of the image Im1. Also, a back icon Ba is displayed in the imageless region produced due to the reduction of the image Im1. In this way, an image Im1 can be reduced by maintaining for a given amount of time an operation that specifies a place on the LCD panel 7.

Herein, an image Im1 may also be reduced in stages according to the amount of time that an operation specifying a place is maintained. The timing for displaying a trash can icon Tr and the timing for opening the lid of the trash can icon Tr may also be determined according to the amount of time that an operation specifying a place is maintained.

The flow of a process in the modification 5 is approximately similar to the flowchart illustrated in FIG. 9. Hereinafter, points that differ will be primarily explained. In the modification 5, the image reduction operation in step S22 may be an operation that maintains for a given amount of time an operation wherein a place on an image Im1 is touched by a forefinger F2. Also, in the modification 5, the cancel operation in step S26 may be an operation that touches a back icon Ba. The processing in step S27 may be processing that determines whether or not a trash can icon Tr has been touched, rather than whether or not a point A can be detected. In other words, in step S27, if it is determined that a trash can icon Tr has been touched, the process proceeds to step S28. If it is determined that a trash can icon Tr has not been touched, the process returns to step S26. Other processing is similar to that of the flowchart illustrated in FIG. 9.

Modification 6

Figure 13A:
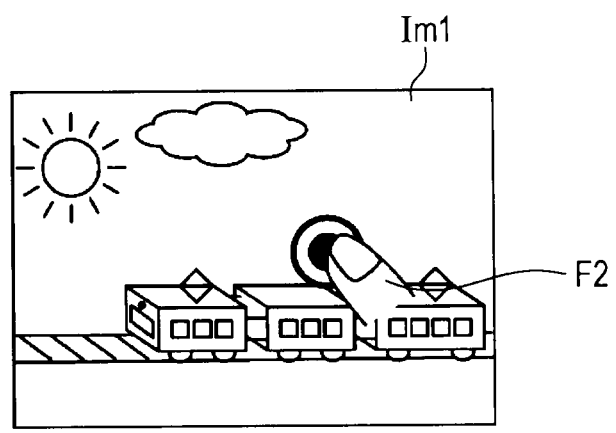
FIGS. 13A and 13B are outlined line drawings for explaining a process in accordance with a modification.
Figure 13B:
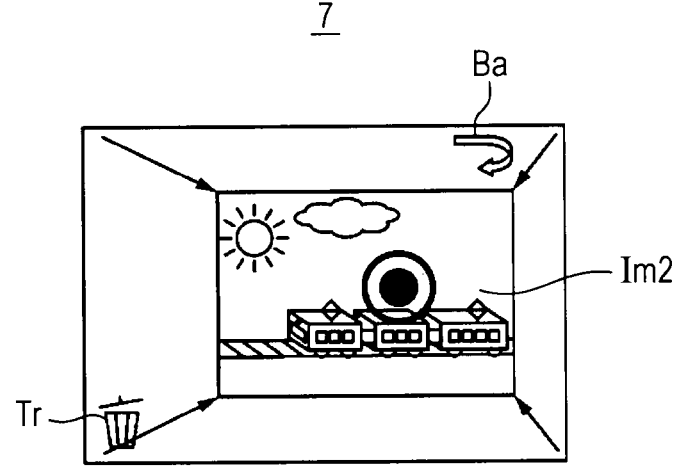

Next, a modification 6 will be described with reference to FIGS. 13A and 13B. As illustrated in FIG. 13A, an image Im1 is displayed on an LCD panel 7. A position-specifying operation is performed wherein a place on the image Im1 is firmly pressed, for example. If a position-specifying operation is performed, the image Im1 is reduced and a reduced image Im2 is displayed, as illustrated in FIG. 13B. A trash can icon Tr is displayed in the imageless region produced due to the reduction of the image Im1. Also, a back icon Ba is displayed in the imageless region produced due to the reduction of the image Im1. In this way, an image Im1 can be reduced by an operation that firmly presses a place on the LCD panel 7.

The flow of a process in the modification 6 is approximately similar to the flowchart illustrated in FIG. 9. Hereinafter, points that differ will be primarily described. In the modification 6, the image reduction operation in step S22 may be a position-specifying operation that firmly presses a place on an image Im1. The cancel operation in step S26 may be an operation that touches a back icon Ba. The processing in step S27 may be processing that determines whether or not a trash can icon Tr has been touched, rather than whether or not a point A can be detected. In other words, in step S27, if it is determined that a trash can icon Tr has been touched, the process proceeds to step S28. If it is determined that a trash can icon Tr has not been touched, the process returns to step S26. Other processing is similar to the flowchart illustrated in FIG. 9.

Modification 7

Figure 14A:
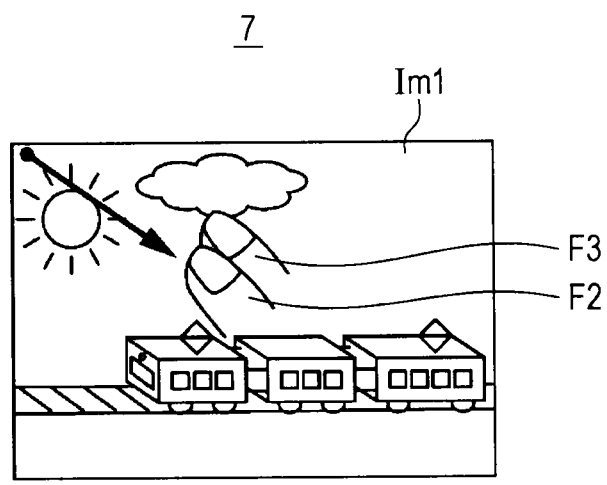
FIGS. 14A and 14B are outlined line drawings for explaining a process in accordance with a modification.
Figure 14B:
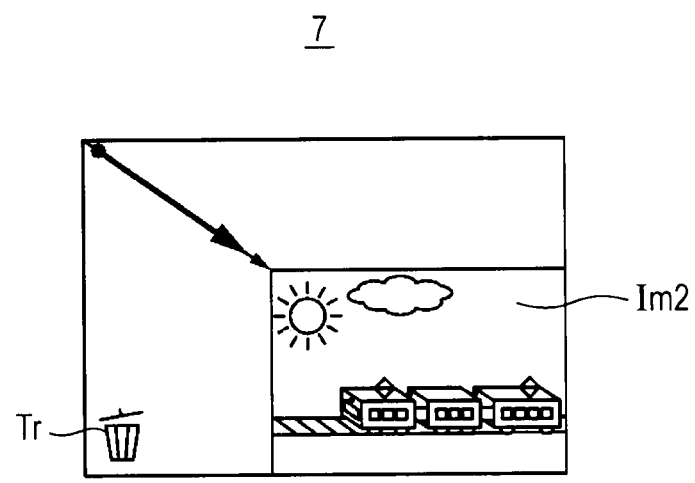

Next, a modification 7 will be described with reference to FIGS. 14A and 14B. The modification 7 is a further modification of the modification 3 described earlier. In the modification 3, a position-specifying operation was performed by causing a single finger to touch a place on an image Im1 (near the upper-left, for example). In the modification 7, a position-specifying operation is performed by causing two fingers to touch two points near the upper-left corner as viewed in the drawing of the image Im1, as illustrated in FIG. 14A. A forefinger F2 and a middle finger F3 may be used as the two fingers, for example. By moving the forefinger F2 and the middle finger F3 in a diagonal direction, the image Im1 is reduced in accordance with the motion of the two fingers, and a reduced image Im2 is displayed.

The flow of a process in the modification 7 is approximately similar to the flowchart illustrated in FIG. 9. Hereinafter, points that differ will be primarily explained. In the modification 7, the image reduction operation in step S22 may be an operation that diagonally moves two points specified by a forefinger F2 and a middle finger F3. Also, the cancel operation in step S26 differs. A cancel operation in the modification 7 may be an operation that moves the forefinger F2 and the middle finger F3 in the direction opposite to the direction moved in order to reduce an image Im1, for example. As illustrated in FIG. 14A, in the case where a forefinger F2 and a middle finger F3 are moved from the upper-left to the lower-right when facing the drawing in order to reduce an image Im1, the cancel operation may be an operation that moves the forefinger F2 and the middle finger F3 from the lower-right to the upper-left. Also, in the processing in step S27, it is determined whether or not the two points specified by the forefinger F2 and the middle finger F3 are detectable. Other processing is similar to that of the flowchart illustrated in FIG. 9.

Herein, a stylus or other instrument rather than fingers may be used with respect to the LCD panel 7 to conduct a position-specifying operation that specifies the place or two places described above.

Modification 8

Next, a modification 8 will be described with reference to FIGS. 15A and 15B. The modification 8 uses a mouse (omitted from illustration) instead of a touch panel 5 as an example of another pointing device.

Figure 15A:
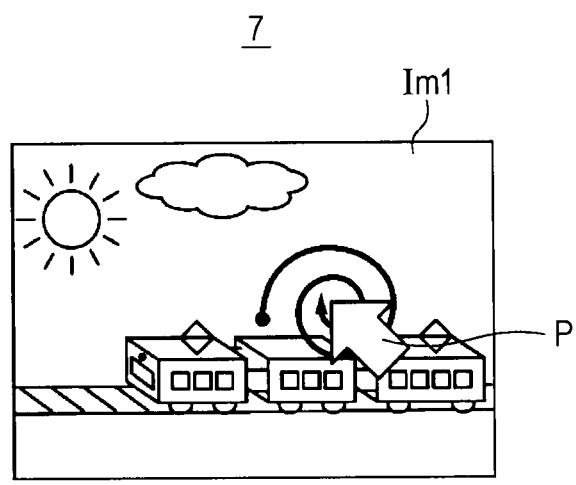
FIGS. 15A and 15B are outlined line drawings for explaining a process in accordance with a modification.
Figure 15B:
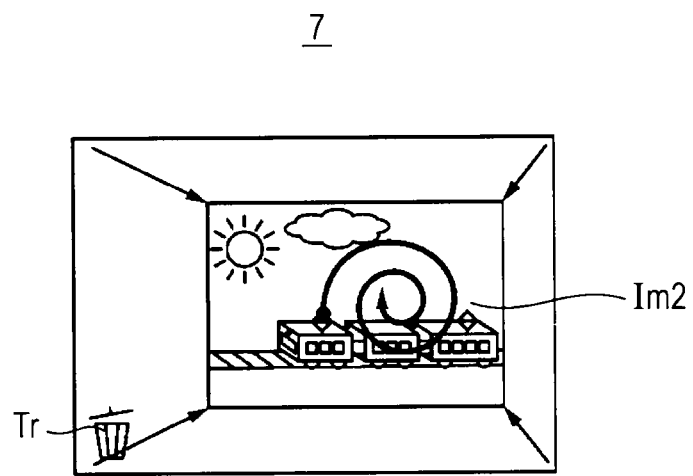

As illustrated in FIG. 15A, an image Im1 and a mouse pointer P are displayed on an LCD panel 7. The mouse pointer P is aligned with a place on the image Im1. Then, a position-specifying operation is performed wherein a left button provided on the mouse (omitted from illustration) is pressed and a place on the image Im1 is specified. While pressing the left mouse button, the mouse is moved so as to cause the mouse pointer P to revolve clockwise. In so doing, as illustrated in FIG. 15B, the image Im1 is reduced, and a reduced image Im2 is displayed. Also, a trash can icon Tr is displayed in the imageless region produced due to the reduction of the image Im1. Herein, the operation that specifies a place on an image Im1 may also be an operation wherein a right button is pressed or an operation wherein a wheel is pressed rather than the left mouse button. An image Im1 may also be reduced according to a wheel spin operation.

Processing operation in the modification 8 is approximately similar to the flowchart illustrated in FIG. 9. Hereinafter, points that differ will be primarily explained. The image reduction operation in step S22 aligns the mouse pointer P with a place on an image Im1, and specifies an arbitrary point on the image Im1 by pressing the left mouse button. Then, an operation is performed wherein the mouse is moved while pressing the left mouse button such that the mouse pointer P revolves clockwise. The cancel operation in step S26 may be an operation that moves the mouse while pressing the left mouse button such that the mouse pointer P revolves counterclockwise.

The determination process in step S27 determines whether or not an operation pressing the left mouse button has been released, for example. In other words, if it is determined that an operation pressing the left button has been released, the process proceeds to step S28. If it is determined that the left button is being pressed, the process returns to step S26. Herein, this processing in step S27 may also be configured to determine whether or not a trash can icon Tr has been clicked.

For example, if it is determined that a trash can icon Tr has been clicked by a mouse operation, the process may be configured to proceed to step S28. If it is determined that a trash can icon Tr has not been clicked, the process may be configured to return to step S26.

Modification 9

Figure 16A:
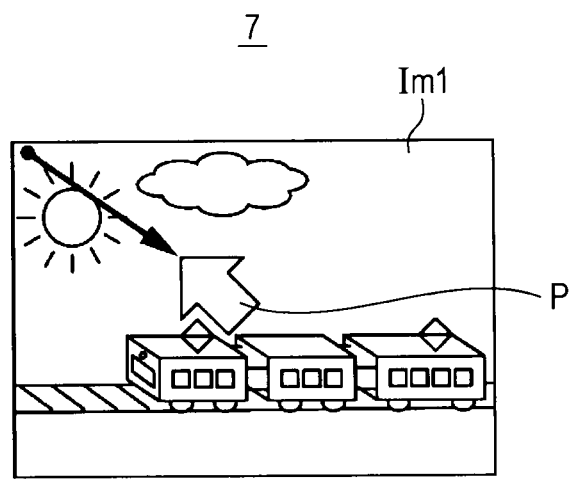
FIGS. 16A and 16B are outlined line drawings for explaining a process in accordance with a modification.
Figure 16B:
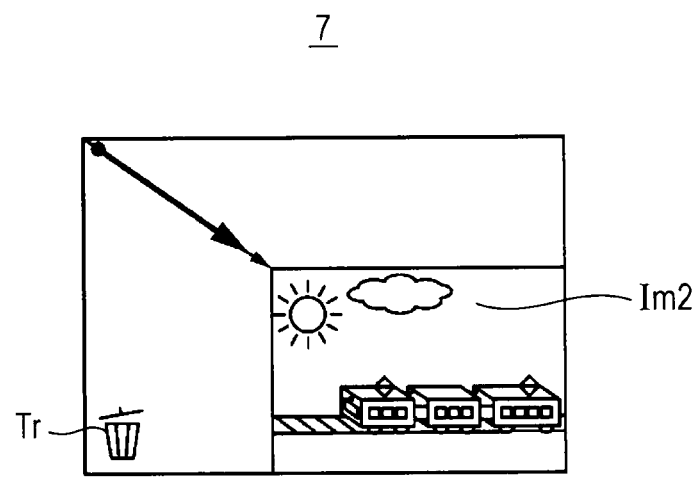

Next, a modification 9 will be described with reference to FIGS. 16A and 16B. As illustrated in FIG. 16A, an image Im1 and a mouse pointer P are displayed on an LCD panel 7. The mouse pointer P is aligned with a place near the upper-left corner of the image Im1 when facing the drawing. Then, an operation is conducted wherein a left button provided on the mouse is pressed and a place near the upper-left corner of the image Im1 is specified. While pressing the left mouse button, an operation is performed to move the mouse such that the mouse pointer P traces a path in a diagonal direction from the upper-left to the lower-right. In so doing, as illustrated in FIG. 16B, the image Im1 is reduced, and a reduced image Im2 is displayed. A trash can icon Tr is displayed in the imageless region produced due to the reduction of the image Im1. Herein, the operation that specifies a place on an image Im1 may also be an operation wherein a right button is pressed or an operation wherein a wheel is pressed rather than the left mouse button. Also, the diagonal direction may also be from the upper-right to the lower-left, from the lower-right to the upper-left, or from the lower-left to the upper-right rather than from the upper-left to the lower-right.

Processing operation in the modification 9 is approximately similar to the flowchart illustrated in FIG. 9. Hereinafter, points that differ will be primarily explained. The image reduction operation in step S22 may be an operation wherein a mouse pointer P is aligned with a place near the upper-left corner of an image Im1, and the mouse is moved while pressing the left mouse button such that the mouse pointer P moves along a diagonal line from the upper-left to the lower-right. Also, the cancel operation in step S26 may be an operation wherein the mouse is moved while pressing the left mouse button such that the mouse pointer P moves along a diagonal line in the direction opposite to the direction for reducing an image Im1, for example. More specifically, the cancel operation may be an operation wherein the mouse is moved while pressing the left button such that the mouse pointer P moves along a diagonal line from the lower-right to the upper-left.

The determination process in step S27 determines whether or not an operation pressing the left mouse button has been released, for example. If it is determined that an operation pressing the left button has been released, the process proceeds to step S28. If it is determined that the left button is being pressed, the process returns to step S26. Herein, this processing in step S27 may also be configured to determine whether or not a trash can icon Tr has been clicked. In other words, if it is determined that a trash can icon Tr has been clicked, the process may be configured to proceed to step S28. If it is determined that a trash can icon Tr has not been clicked, the process may be configured to return to step S26.

Modification 10

Figure 17A:
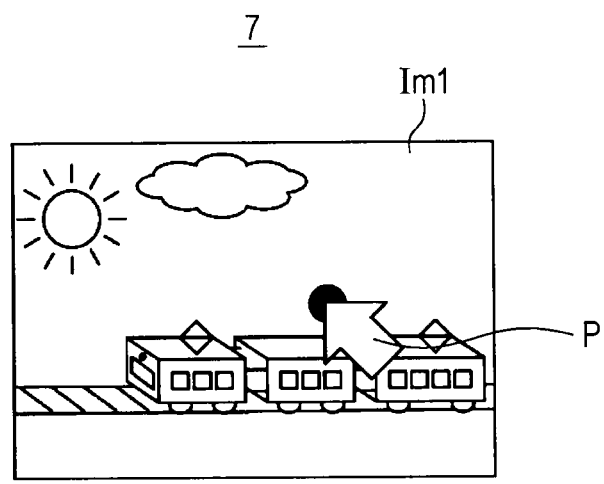
FIGS. 17A and 17B are outlined line drawings for explaining a process in accordance with a modification.
Figure 17B:
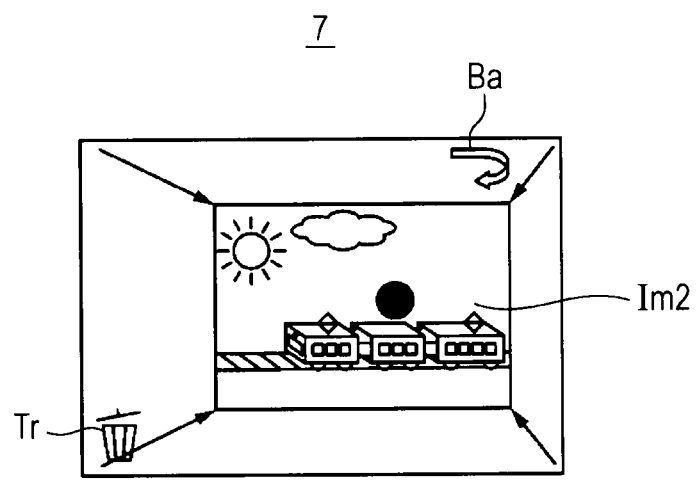

Next, a modification 10 will be described with reference to FIGS. 17A and 17B. As illustrated in FIG. 17A, an image Im1 and a mouse pointer P are displayed on an LCD panel 7. The mouse pointer P is aligned with a place on the image Im1. Then, an position-specifying operation is performed wherein a left button provided on the mouse is pressed and a place on the image Im1 is specified. If an operation continuously pressing the left mouse button is maintained for given amount of time or more, the image Im1 is reduced as illustrated in FIG. 17B, and a reduced image Im2 is displayed. A trash can icon Tr is displayed in the imageless region produced due to the reduction of the image Im1. Additionally, a back icon Ba is displayed in the imageless region produced due to the reduction of the image Im1.

Processing operation in the modification 10 is approximately similar to the flowchart illustrated in FIG. 9. Hereinafter, points that differ will be primarily explained. The image reduction operation in step S22 may be an operation that aligns the mouse pointer P with a place on an image Im1 and continuously presses the left mouse button for a given amount of time or more, for example. Also, the cancel operation in step S26 may be an operation wherein the back icon Ba is clicked.

The determination process in step S27 determines whether or not a trash can icon Tr has been clicked. In step S27, if it is determined that a trash can icon Tr has been clicked, the process proceeds to step S28. If it is determined that a trash can icon Tr has not been clicked, the process returns to step S26.

Herein, the mouse button used in operations that specify a place on an image Im1 and reduce an image Im1 is not limited to being a left button. For example, a right button or wheel provided on a mouse may also be pressed.

Modification 11

Figure 18A:
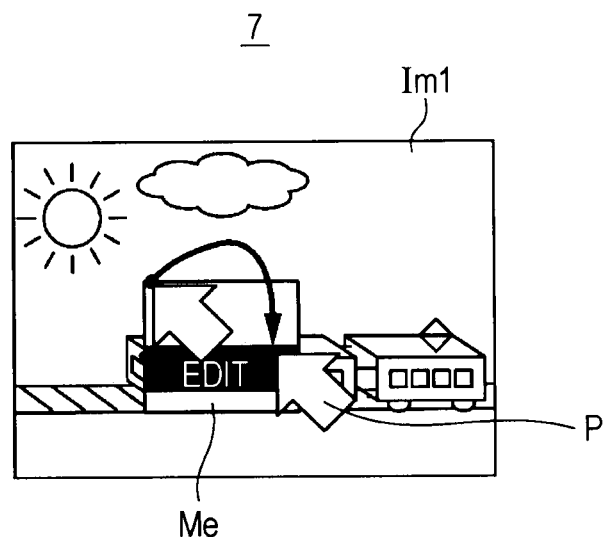
FIGS. 18A and 18B are outlined line drawings for explaining a process in accordance with a modification.
Figure 18B:
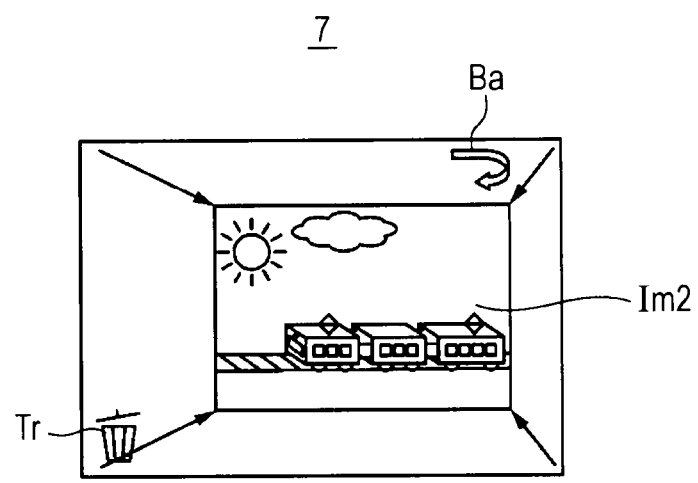

Besides the above, an image Im1 can also be reduced by clicking a right mouse button to display a menu screen Me selecting an edit function from the menu screen Me, as illustrated in FIGS. 18A and 18B. A reduced image Im2 is displayed by reducing an image Im1. A trash can icon Tr and a back icon Ba are displayed in the imageless region produced due to the reduction of the image Im1.

Modification 12

Figure 19A:
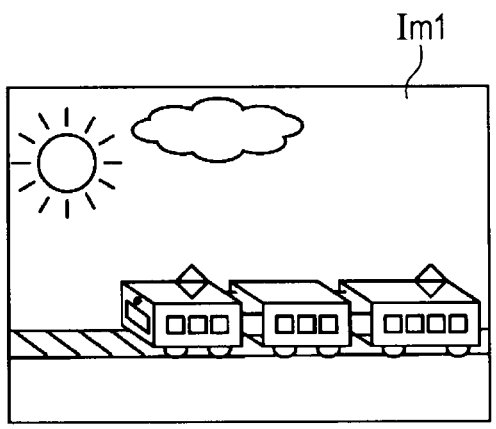
FIGS. 19A and 19B are outlined line drawings for explaining a process in accordance with a modification.
Figure 19B:
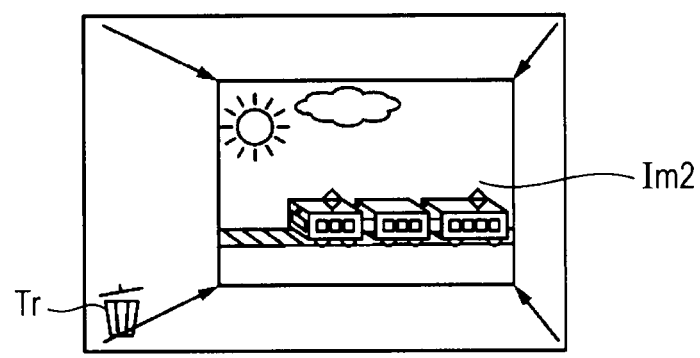

Next, a modification 12 will be described with reference to FIGS. 19A and 19B. The modification 12 reduces an image Im1 by a zoom key or wheel (omitted from illustration) rather than a mouse. As illustrated in FIG. 19A, an image Im1 is displayed on an LCD panel 7. At this point, an image reduction operation is performed by continuously pressing a zoom key, and as illustrated in FIG. 19B, the image Im1 is reduced and a reduced image Im2 is displayed. Additionally, a trash can icon Tr is displayed in the imageless region produced due to the reduction of the image Im1.

Also, an image Im1 may be reduced by rotating a spherical wheel to the right rather than a zoom key, and a trash can icon Tr may be displayed in the imageless region produced due to the reduction of the image Im1. An operation to reduce an image Im1 may also be conducted in this way with an input device other than a mouse.

Modification 13

Figure 20A:
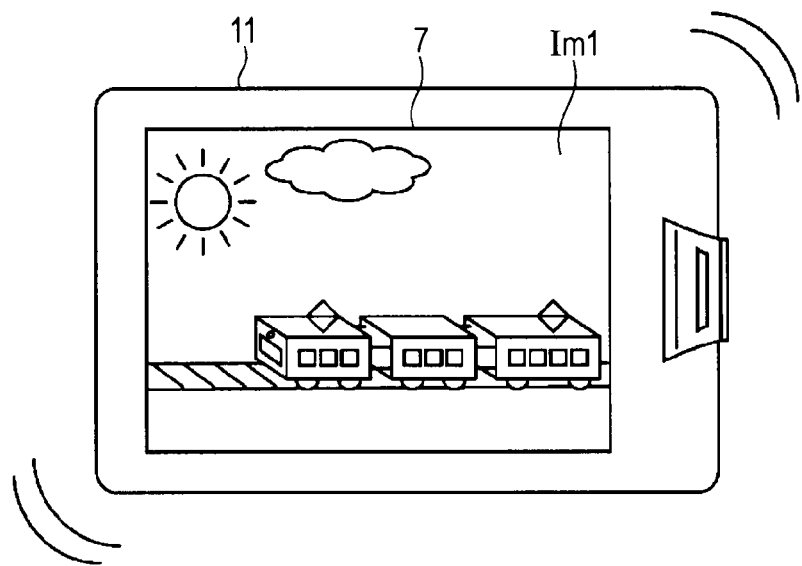
FIGS. 20A and 20B are outlined line drawings for explaining a process in accordance with a modification.
Figure 20B:
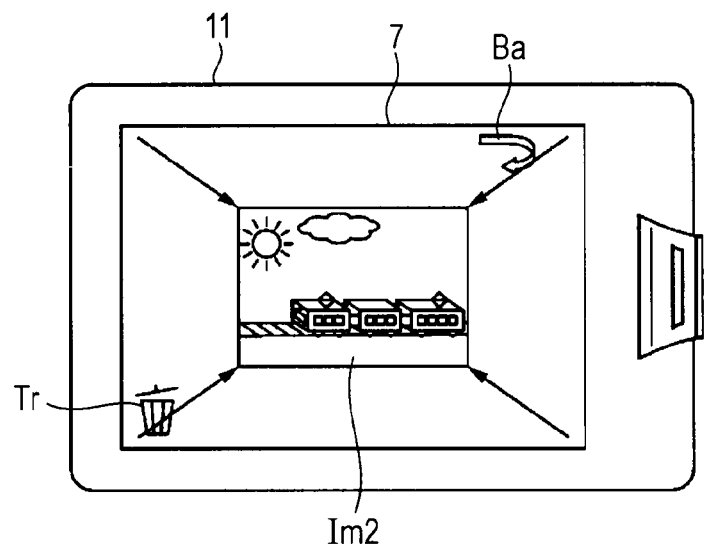

Next, a modification 13 will be described with reference to FIGS. 20A and 20B. In the modification 13, the display control apparatus 10 is taken to be a portable apparatus, and as illustrated in FIG. 20A, an LCD panel 7 is provided on a chassis 11 included in the display control apparatus 10. An image Im1 is displayed on the LCD panel 7. Also, an acceleration sensor not illustrated is provided in the display control apparatus 10. The acceleration sensor may be a gyro sensor, for example. Motion of the chassis 11 is detected by the gyro sensor, and detected motion information is supplied to a CPU 1.

For example, the chassis 11 may be shaken in a direction parallel to the LCD panel 7, as illustrated in FIG. 20A. The direction in which the chassis 11 is shaken may be the up-down direction, the left-right direction, or a diagonal direction. Vibration produced as a result of the shaking of the chassis 11 is detected by the gyro sensor. Vibration detected by the gyro sensor is supplied to the CPU 1 as motion information. According to the motion information, the CPU 1 conducts control to display a reduced image Im2 of the image Im1 reduced by a given ratio in a given region of the LCD panel 7. In so doing, a reduced image Im2 is displayed on the LCD panel 7, as illustrated in FIG. 20B. A trash can icon Tr and a back icon Ba are displayed in the imageless region produced due to the reduction of the image Im1.

If the trash can icon Tr is touched, the reduced image Im2, the trash can icon Tr, and the back icon Ba are removed, and image data of the image Im1 corresponding to the reduced image Im2 is deleted. Then, the next image data is read out and displayed on the LCD panel 7. When the back icon Ba is touched, the image Im1 is displayed instead of the reduced image Im2.

Figure 21:
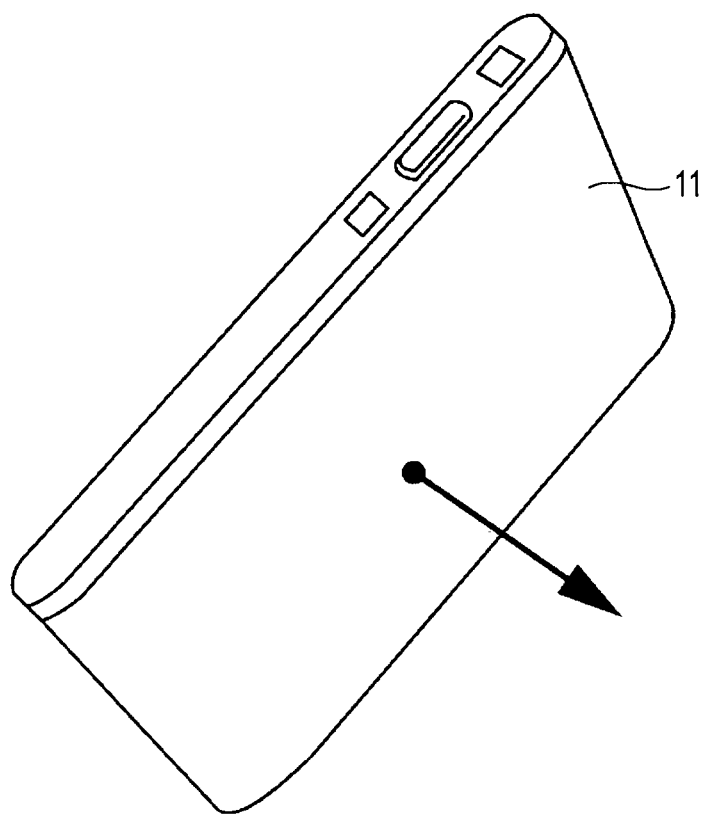
FIG. 21 is an outlined line drawing for explaining a process in accordance with a modification.

Herein, the direction in which to shake the chassis 11 is not limited to being a direction parallel to the LCD panel 7. For example, as illustrated in FIG. 21, an image Im1 may be reduced and a reduced image Im2 may be displayed by shaking so as to push the chassis 11 in the forward and backward directions. An image Im1 may also be reduced in stages according to the vibration magnitude.

Modifications of an embodiment of the disclosed technology are not limited to the modifications discussed above, and various other modifications are also possible. For example, it is possible to appropriately modify the details of a cancel operation in the embodiment and modifications. Also, it is possible to appropriately modify the details of a determination process when deleting image data. Also, the cancel operation is not limited to being a specific operation that is specifically performed. In other words, if a process for deleting image data is not conducted for a given amount of time, it may be considered that a cancel operation has been performed, and the original-size image may be displayed.

It is possible to appropriately modify the timing for displaying a trash can icon Tr and the timing for displaying the opening of the lid of the trash can icon Tr. For example, the determination in step S8 of FIG. 5 may also be configured to determine whether or not a reduced image Im2 has been moved to a region within a given value w from the middle of the trash can icon Tr. Also, a trash can icon Tr may be displayed and the lid of the trash can icon Tr may be opened according to a reduced image Im2 being moved to a region of the LCD panel 7 wherein the trash can icon Tr is displayed (such as the first quadrant described using FIG. 6). When an image Im1 is reduced in stages, the timing for displaying a trash can icon Tr and the timing for displaying the opening of the lid of the trash can icon Tr may also be determined according to the proportional reduction of the image Im1.

In the embodiment and modification discussed above, image data is described as being data recorded onto a recording device 6, but it is also possible to display on the LCD panel 7 image data acquired from external equipment via an interface not illustrated or image data acquired via a network, rather than just image data recorded onto the recording device 6. Also, an embodiment may be configured such that a command for deleting image data is transmitted from the display control apparatus 10 to external equipment, and a process for deleting image is conducted in the external equipment.

In the embodiment and modifications discussed above, the process executed with respect to image data is described as being a deletion process, but is not limited to a deletion process. Various processes may be executed, such as a process for protecting image data, a process for registering image data in a favorites list, a process for automatically uploading image data, or a process for storing image data in a given folder, for example. Different display information corresponding to respective processes may be displayed in an imageless region produced due to reduction of an image. Herein, a plurality of display information may also be displayed in a region produced due to reduction of an image. A plurality of display information may also be respectively displayed in different quadrants.

In the embodiment discussed earlier, a position-specifying operation is conducted with respect to positions at two places on an LCD panel 7 by using a thumb F1 and a forefinger F2, but a position-specifying operation may also be conducted with respect to positions at more than two places. For example, a position-specifying operation may also be conducted with respect to positions at three places by using three fingers. An image pinching operation may be performed by moving the three fingers that conducted the position-specifying operation towards a single place, and an image may be reduced according to the image pinching operation.

In the embodiment and modification 1 discussed earlier, the LCD panel 7 and the LCD panel 17 were taken to be divided into four regions, but are not limited thereto, and may also be divided into three regions or eight regions, for example. Also, the virtual region Is in the modification 1 was described as having four regions, but is not limited thereto, and may also be taken to have three or eight regions, for example. Also, the size of individual regions may also not be equal.

The embodiment and plurality of modifications discussed above may also be mutually combined, and for example may be configured as a display control apparatus in which an image can be reduced by finger operations and in which an image can be reduced by physical means such as a stylus. Also, respective processes in the embodiment and modifications are also taken to be convertible to other examples as long as technological inconsistencies are not produced.

Furthermore, it is possible for the configuration and operation of a display control apparatus in accordance with the embodiment and modifications to be realized as a display control method, a display control program, and a recording medium storing a display control program, in addition to a display control apparatus.

The present disclosure contains subject matter related to that disclosed in Japanese Priority Patent Application JP 2010-156639 filed in the Japan Patent Office on Jul. 9, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a processor configured to:
control a user interface to reduce a size of a displayed content based on a received input; and
control the user interface to display an operation to be performed on the content based on the size reduction, wherein
the reduced content is moved in a direction toward the displayed operation so as to perform the operation.

2. The information processing device of claim 1, wherein the user interface includes a touch panel display configured to detect a touch input.

3. The information processing apparatus of claim 2, wherein the processor is configured to detect an amount of pressure corresponding to a touch input, compare the amount of pressure to a threshold value, and control the display to reduce the size of the displayed content when the amount of pressure exceeds the threshold value.

4. The information processing apparatus of claim 3, wherein the processor is configured to control the operation to be performed when a touch input is received in a region of the touch panel display corresponding to the operation.

5. The information processing device of claim 1, wherein the user interface includes sensors configured to detect an input based on gestures performed in close proximity to the user interface.

6. The information processing device of claim 1, wherein the processor is configured to detect a first input and a second input contemporaneously received at the user interface, compare a distance between the first input and the second input to a threshold value, and control the user interface to reduce the size of the displayed content based on the comparison.

7. The information processing apparatus of claim 6, wherein the processor is configured to determine a first distance between the first input and the second input.

8. The information processing apparatus of claim 7, wherein the processor is configured to detect a movement of at least one of the first input and a second input received at the user interface.

9. The information processing apparatus of claim 8, wherein the processor is configured to determine a second distance between the first input and the second input after the movement.

10. The information processing apparatus of claim 9, wherein the processor is configured to determine a difference between the first distance and the second distance, compare the difference to a threshold value, and control the user interface to reduce the size of the displayed content based on the comparison.

11. The information processing apparatus of claim 1, wherein the processor is configured to control the user interface to display a graphic representation corresponding to the operation based on the size reduction, determine a distance between the received input and the graphic representation, and compare the determined distance to a threshold value.

12. The information processing apparatus of claim 11, wherein the processor is configured to control the user interface to change a state of the graphic representation when the distance is less than the threshold value.

13. The information processing apparatus of claim 11, wherein the processor is configured to perform the operation when the distance is less than the threshold value and the input is no longer received.

14. The information processing apparatus of claim 1, wherein the processor is configured to detect a revolving input at the user interface, and control the display to reduce the size of the displayed content based on the revolving input.

15. The information processing apparatus of claim 1, wherein the processor is configured to detect a sliding input, and the processor is configured to control the display to reduce the size of the displayed content based on the sliding input.

16. The information processing apparatus of claim 1, wherein the touch panel display is configured to detect a tapping input, and the processor is configured to control the display to reduce the size of the displayed content based on the tapping input.

17. The information processing apparatus of claim 16, wherein the processor is configured to control the operation to be performed when a touch input is received in a region of the user interface corresponding to the operation.

18. The information processing apparatus of claim 1, wherein the processor is configured to detect a length of time that an input is continuously received, compare the length of time to a threshold value, and control the display to reduce the size of the displayed content when the length of time exceeds the threshold value.

19. The information processing apparatus of claim 18, wherein the processor is configured to control the operation to be performed when an input is received in a region of the user interface corresponding to the operation.

20. An information processing method performed by an information processing apparatus, the method comprising:

displaying content at a user interface of the information processing apparatus;

receiving an input at the user interface;

reducing a size of the displayed content based on the received input; and displaying an operation to be performed on the content based on the size reduction of the image, wherein the reduced content is moved in a direction toward the displayed operation so as to perform the operation.

21. A non-transitory computer-readable medium including computer program instructions, which when executed by an information processing apparatus, cause the information processing apparatus to perform a method comprising:

displaying content;

receiving an input corresponding to the displayed content;

reducing a size of the displayed content based on the received input; and displaying an operation to be performed on the content based on the size reduction of the image, wherein the reduced content is moved in a direction toward the displayed operation so as to perform the operation.

* * * * *